United States Patent [19]

Isa et al.

[11] 3,910,973

[45] Oct. 7, 1975

[54] METHOD OF MANUFACTURING CARBOXYLATES

[75] Inventors: Hiroshi Isa, Funabashi; Takeshi Inomiya; Kenji Karube, both of Tokyo; Takeshi Takemoto, Ichikawa; Masuzo Nagayama, Tokyo, all of Japan

[73] Assignee: Lion Fat & Oil Co., Ltd., Tokyo, Japan

[22] Filed: Jan. 26, 1973

[21] Appl. No.: 327,247

[30] Foreign Application Priority Data
Jan. 31, 1972 Japan............................... 47-11571

[52] U.S. Cl................................ 260/413; 252/367
[51] Int. Cl.²....................................... C08H 17/36
[58] Field of Search........................... 260/413, 414

[56] References Cited
UNITED STATES PATENTS

| | | | |
|---|---|---|---|
| 1,926,088 | 9/1933 | Strosacker et al. | 260/413 X |
| 2,252,658 | 8/1941 | Bigelow | 260/414 |
| 2,384,817 | 9/1945 | Chitwood | 260/413 X |
| 2,407,066 | 9/1946 | Dunlop | 260/347.3 |
| 2,860,151 | 11/1958 | Lamson | 260/414 |

OTHER PUBLICATIONS

Klisurki, C. A. 66. 108707n.

*Primary Examiner*—Ethel G. Love
*Attorney, Agent, or Firm*—Woodhams, Blanchard and Flynn

[57] ABSTRACT

A method of manufacturing carboxylates through an oxidative dehydrogenation reaction of alcohols or aldehydes with alkali metal compounds, which is characterized by the step of adding an oxygen-containing titanium compound to the reaction system.

5 Claims, No Drawings

METHOD OF MANUFACTURING CARBOXYLATES

BACKGROUND OF THE INVENTION a. Field of the Invention

The present invention relates to an improved method of manufacturing carboxylates through an oxidative dehydrogenation reaction of alcohols or aldehydes with alkali metal compounds.

b. Description of the Prior Art

The art of producing carboxylates by oxidizing alcohols or aldehydes with alkali metal compounds has been known for a long time, but the starting material for the oxidation in the prior art has been mostly alcohols of lower or medium grade and the reaction rate usually is very low. Effectuation of said reaction at a high temperature with a view to speeding up the reaction would give rise to side reactions, entailing a decrease in yield. With the recent entry of synthetic fatty acids into the limelight, however, various methods of snythesizing carboxylates by using the inexpensive higher alcohols mass-produced by the Ziegler process or oxosynthesis have been tried. With the object of improving this method, U.S. Pat. No. 3,370,074, for instance, has proposed application of tridecanol, coupled with addition of a small amount of water to the reaction system, to thereby increase the yield up to 95.0%. This method, however, involves a process of removing the residual 5% impurities inasmuch as the carboxylate product, in order to serve as a base for toilet soap, is required to be of high quality. U.S. Pat. No. 3,365,476 has proposed a method of increasing the reaction rate as well as the yield by virtue of the addition of a solid carbon such as active carbon, carbon black and the like as catalyst to the reaction system. According to this method, by the application of, for instance, iso-octanol, a reaction temperature of 285°C and a reaction time of 1.5 hours, the yield is increased up to 96.5%. Generally speaking, the longer is the chain of the material carbon, the more the reaction rate as well as the yield tends to decrease thereby resulting in an increase of impurities. Meanwhile, as the base for a high-quality soap like toilet soap, a material comprising a long carbon chain such as in the range of $C_{12}$ to $C_{20}$ is to be employed. Therefore, in case of preparing the base for toilet soap by this method, it is anticipated that both the reaction rate and the yield may further decrease, so that the reaction product can be of no practical use as it is. Besides, from the view point of mass-production, it is defective in that it involves vexatious questions such as the filtration process for removing the solid carbon employed as the catalyst, the residual disposition process attendant thereon, and so forth.

In addition to the above methods, there is also known a method wherein the reaction is effected at a temperature of 220° to 230°C by employing the compounds of Cu, Pb, Cd, etc. as the catalyst for alkali oxidation. However, this method also involves vexatious questions similar to those in the case of employment of active carbon as the catalyst.

SUMMARY OF THE INVENTION

The present invention is intended to solve all the foregoing problems in the prior art, and to provide a method of manufacturing carboxylates from the alcohols or aldehydes by employing a catalyst capable of not only converting said materials into carboxylates in a practically fixed quantity but also rendering the resulting carboxylates servable as a base for soap directly.

The present invention is characterized by the step of adding an oxygen-containing titanium compound to the reaction system in the course of effecting the oxidative dehydrogenation reaction of alcohols or aldehydes, namely, $RCH_2OH + NaOH \rightarrow RCOONa + 2H_2\uparrow$ or $RCHO + NaOH \rightarrow RCOONa + H_2\uparrow$ (wherein R represents alkyl).

Said oxygen-containing titanium compound includes titanium dioxide, titanic acid, methatitanic acid, pertitanic acid, etc. which are known as whitening agents for use in soap. These compounds may be added at any ratio to the starting material alcohols or aldehydes, but application of an excessive amount thereof tends to decrease the reaction rate, so that it is desirable to apply them to the extent of 0.1 to 5 mol%, preferably 0.1 to 1 mol%, relative to the alcohols or aldehydes. However, in case where the carboxylate resulting from the present reaction is to serve directly as a base for toilet soap, it is preferable to adjust the amount of titanium dioxide to be added to the reaction system such that the ratio of its content in the product carboxylate be in the range of 0.1 to 0.4 wt.% inasmuch as the whole quantity of titanium dioxide added to the reaction system is to be present in the product carboxylate and the appropriate amount of titanium dioxide to be contained in toilet soap is usually in the range of 0.1 to 0.4 wt.%. In case where the carboxylate resulting from the present reaction is to be used upon mixing with tallow soap and the like, the amount of it to be added may be modified according to the mixing ratio thereof. For instance, in the case of preparing a base for soap by effecting reaction between 1-dodecanol as the starting material alcohol and NaOH as the metal salt and mixing the resulting carboxylate with tallow soap at a ratio of 3:7, as the amount of the product carboxylate per 1 mol of the starting material alcohol is 222 g, there is obtained a base for soap in the amount of 740 g. As it is possible to mix this soap base with titanium dioxide to the extent of 0.1 to 0.4 wt.%, the critical amount of titanium dioxide to be added comes to be 2.96 g. To express this amount in terms of mol% relative to the alcohol, it comes to be 3.7 mol%.

The alcohol or aldehyde for use as the starting material in the present invention includes aliphatic compounds of either branched-chain structure or straight-chain structure providing that they have a number of carbon atoms ranging from 8 to 30 and mixtures thereof. For instance, n-octyl alcohol, 1-dodecanol, n-tridecyl aldehyde as well as their mixtures are applicable.

As the alkali metal compound for use in the present invention, any metal compound selected from the group consisting of alkali metal oxides and alkali metal hydroxides will do. It includes, for instance, oxides as well as hydroxides of Na, Li and K, preferably oxides as well as hydroxides of Na and K.

As to the appropriate amount of the alkali metal compound for use in effecting the reaction in the present invention, it substantially suffices to apply a stoichiometric amount thereof necessary for oxidizing the alcohol or aldehyde into a carboxylate, but the mol ratio of said alkali metal compound to the alcohol or aldehyde can be changed so as to be 1 to 4 mols, preferably 1 to 1.5 mol, of alkali metal compound per 1 mol of alcohol. In this connection, the appropriate reaction temperature is usually in the range of 280°C to 330°C, but in view of the fact that the reaction rate is rather slow at a temperature of 280°C or thereabouts, it is preferable to be in the range of 300°C to 330°C.

According to the present invention, the oxygen-containing titanium compound for use as the catalyst can serve as a whitening agent and, besides, this catalyst works to remarkably control the occurrence of side reactions, rendering conversion of the starting material higher alcohol or aldehyde into carboxylate in a practically fixed quantity, so that the resulting carboxylate can be employed as a base for toilet soap directly without undergoing any refining process. In the case of employing titanium dioxide, though application of a temperature in the range of 280°C to 300°C or thereabouts admittedly tends to slow down the reaction rate as compared with the case of non-catalytic reaction, inasmuch as the occurrence of side reactions can be remarkably controlled even when the reaction is effected at a high temperature of more than 300°C, the reaction rate can be accelerated by applying such a high temperature in effecting the reaction.

Hereunder will be given some examples of performances of the reactions effected by the conventional methods for the purpose of comparison and examples of performances of the method embodying the present invention.

DESCRIPTION OF THE PREFERRED EMBODIMENTS

Comparative Example 1

10.5 g (0.25 mol) of 96% solid caustic soda was put in a 300 ml electromagnetic stirrer-type autoclave, and air therein was replaced with nitrogen. Thereafter, while maintaining the nitrogen pressure within the autoclave at 10 Kg/cm², the autoclave were put in a molten inorganic salt bath which was previously heated up to about 280°C, whereby the autoclave was pre-heated up to 280°C. Subsequently, by means of a quantity-pumping device, 40 g (0.2 mol) of Dobanol-23 (a mixture of $C_{12}$ alcohol and $C_{13}$ alcohol, manufactured by Shell Oil K.K.) was charged to the autoclave. Since the pressure increased due to evolution of hydrogen as the reaction proceeded, the reaction pressure was maintained at 20 Kg/cm² by removing the generated hydrogen out of the autoclave chamber while the reaction was carried on. Upon completing the reaction in 200 minutes, the reactor was cooled. The result of analysis showed that the product from this reaction contained 3.68% of unsaponifiable matter, of which the greater part consisted of paraffin and ketone resulting from side reactions. And, the selectivity was 96.2%.

Comparative Example 2

Comparative Example 1 was repeated except that a reaction time of 120 minutes and a reaction temperature at 300°C were employed. The result of analysis of the product carboxylate showed that it contained 3.81% of unsaponifiable matter, of which the greater part consisted of paraffin and ketone resulting from side reactions like in the case of Comparative Example 1. And, the selectivity was 96.1%.

Example 1

Comparative Example 1 was repeated except that there was used 10.5 g (0.25 mol) of caustic soda, 40 g (0.2 mol) of Dobanol-23 and 0.5 g (3.15 mol% relative to the alcohol) of titanium dioxide.

The resulting carboxylate contained 0.86% of unsaponifiable matter, of which the greater part consisted of unreacted alcohol. The selectivity was 99.9%.

When the thus obtained carboxylate was mixed with tallow soap in an amount four times as much as said carboxylate and the mixture was formed into a cake of toilet soap by a soap press, the resulting soap was of superior quality and fine color tone. This soap contained mixed therein 0.5 g of titanium dioxide employed for the purpose of reaction, but this content corresponds to 0.21 wt.% relative to the whole soap.

Example 2

Comparative Example 2 was repeated except that there was used 10.5 g (0.25 mol) of caustic soda, 40 g (0.2 mol) of Dobanol-23 and 0.5g (3.15 mol% relative to alcohol) of titanium dioxide. The resulting carboxylate contained 0.45% of unsaponifiable matter (including a trace of ketones) of which the greater part consisted of unreacted alcohol. The selectivity was 99.9%.

Example 3

Example 2 was repeated except that there was used 10.5 g (0.25 mol) of caustic soda, 40.1 g (0.2 mol) of Diadole-115 (a blend of $C_{11}$ alcohol, $C_{13}$ alcohol and $C_{15}$ alcohol, manufactured by MITSUBISHI KASEI K.K.), 0.5 g (3.15 mol% relative to alcohol) of titanium dioxide, the reaction temperature was 315°C and the reaction time was 80 minutes. The resulting carboxylate contained 0.20% of unsaponifiable matter (including a trace of ketones) of which the greater part consisted of unreacted alcohol. The selectivity was 99.9%.

Example 4

Example 2 was repeated except that there was used 10.5 g (0.25 mol) of caustic soda, 50 g (0.2 mol) of Alfol-16 18 (a blend of $C_{16}$ alcohol and $C_{18}$ alcohol, manufactured by ETHYL Co., Ltd.), 0.5 g (3.15 mol% relative to alcohol) of titanium dioxide the reaction temperature was, 300°C and the reaction time was 120 minutes. The resulting carboxylate contained 0.41% of unsaponifiable matter (including a trace of ketones) of which the greater part consisted of unreacted alcohol. The selectivity was 99.9%.

Example 5

Reaction was effected in the same way as in Example 2 except 10.5 g (0.25 mol) of caustic soda, 50 g (0.2 mol) of Dobanol-23, 0.15 g (0.94 mol% relative to alcohol) of titanium dioxide, a reaction temperature of 305°C and a reaction time of 100 minutes. The resulting carboxylates contained 0.52% of unsaponifiable matter (including a trace of ketones) of which the greater part consisted of unreacted alcohol. The selectivity was 99.9%.

Example 6

10.5 g (0.25 mol) of 96% solid caustic soda and 0.5 g (3.15 mol% relative to aldehyde) of titanium dioxide were put in a 300 ml electromagnetic stirrer-type autoclave, and air therein was replaced with nitrogen. Subsequently, while maintaining the nitrogen pressure inside the autoclave at 10 Kg/cm², the autoclave were put in an inorganic bath as previously heated up to about 300°C, whereby the autoclave was pre-heated up to 300°C. Next, by means of a quantity-pumping device, 36.4 g (0.2 mol) of n-dodecyl aldehyde was introduced into the reaction zone of the autoclave by dropping over about an hour and a half. Reaction started as soon as n-dodecyl aldehyde was dropped in the reaction system, and the inner pressure of the autoclave increased due to generation of hydrogen. Therefore, reaction pressure was maintained at 20 Kg/cm² by removing the generated hydrogen out of the autoclave chamber while the reaction was carried on. Upon completing said reaction in 120 minutes, the reaction product was cooled.

The result of analysis of this reaction product showed that it contained 0.4% of unsaponifiable matter, of which the greater part consisted of a mixture of unreacted aldehyde and alcohol. The selectivity was 99.9%.

What is claimed is:

1. In a process which consists essentially of reacting at from 280° to 330°C, (A) a reactant selected from the group consisting of alcohols of the formula $RCH_2OH$, aldehydes of the formula RCHO and mixtures thereof, wherein R is alkyl, said alcohols and aldehydes having from 8 to 30 carbon atoms, with (B) at least about a stoichiometric amount of alkali metal compound selected from the group consisting of alkali metal oxides and alkali metal hydroxides, under oxidative dehydrogenation conditions, to transform said reactant (A) to an alkali metal carboxylate of the formula RCOOM, wherein R is as defined above and M is an alkali metal, the improvement which comprises said reaction is carried out in the presence of a catalytically effective amount of titanium dioxide as the sole catalyst in the reaction system.

2. A process according to claim 1 in which the amount of titanium dioxide is from 0.1 to 0.5 mol percent, based on the number of mols of reactant (A).

3. A process according to claim 2 in which the amount of said alkali metal compound is from 1 to 4 mols, per mol of said reactant (A).

4. A process according to claim 3 in which the amount of said alkali metal compound is from 1 to 1.5 mols, per mol of reactant (A), and the reaction temperature is from 300° to 330°C.

5. A process according to claim 1 in which said reactant (A) has from 12 to 20 carbon atoms.

* * * * *